(12) United States Patent
Zhai et al.

(10) Patent No.: US 11,743,364 B2
(45) Date of Patent: Aug. 29, 2023

(54) METHOD FOR INTERCONVERSION BETWEEN PROTOCOLS

(71) Applicant: Beijing Jiaotong University, Beijing (CN)

(72) Inventors: Gaoshou Zhai, Beijing (CN); Ziqi Zhai, Beijing (CN); Honghui Li, Beijing (CN); Feng Liu, Beijing (CN); Qiong Luo, Beijing (CN); Jia Wang, Beijing (CN); Wenjie Chen, Beijing (CN)

(73) Assignee: BEIJING JIAOTONG UNIVERSITY, Beijing (CN)

( * ) Notice: Subject to any disclaimer, the term of this patent is extended or adjusted under 35 U.S.C. 154(b) by 0 days.

(21) Appl. No.: 17/843,334

(22) Filed: Jun. 17, 2022

(65) Prior Publication Data

US 2022/0407946 A1 Dec. 22, 2022

(30) Foreign Application Priority Data

Jun. 21, 2021 (CN) .......................... 202110702286.8

(51) Int. Cl.
*G06F 15/16* (2006.01)
*H04L 69/08* (2022.01)

(52) U.S. Cl.
CPC .................. *H04L 69/08* (2013.01)

(58) Field of Classification Search
CPC ....... H04L 69/08; H04L 67/125; H04L 67/55; H04L 67/02

USPC ......................................................... 709/230
See application file for complete search history.

(56) References Cited

U.S. PATENT DOCUMENTS

| | | | | |
|---|---|---|---|---|
| 2019/0137622 A1* | 5/2019 | Lopez-Hinojosa | ... | G01S 13/867 |
| 2022/0035322 A1* | 2/2022 | Tseng | ...................... | H04L 69/08 |
| 2022/0206473 A1* | 6/2022 | Qiu | ...................... | H04L 43/0876 |
| 2022/0350685 A1* | 11/2022 | Li | ........................ | G06F 9/44505 |

* cited by examiner

*Primary Examiner* — Nicholas P Celani
*Assistant Examiner* — Karina J Garcia-Ching
(74) *Attorney, Agent, or Firm* — KEATING & BENNETT, LLP

(57) ABSTRACT

A method for interconversion between protocols, including the following steps: pre-establishing a publication/subscription list; when a packet published by a publisher is received, searching the publication/subscription list for a protocol type of the packet; extracting a packet data payload from the packet; determining whether a size of the packet data payload is less than a preset combination threshold; if yes, sending the packet data payload to a packet data payload queue of the publisher, and combining a packet data payload in the packet data payload queue when a size of the packet data payload queue reaches a preset transmission threshold or no new packet is received after a preset waiting duration; searching the publication/subscription list for all subscribers corresponding to the publisher; and performing protocol conversion on the packet one by one based on protocol types used by the corresponding subscribers, and sending protocol-converted packets to the corresponding subscribers.

5 Claims, 4 Drawing Sheets

METHOD FOR INTERCONVERSION BETWEEN PROTOCOLS

CROSS REFERENCE TO RELATED APPLICATION(S)

This patent application claims the benefit and priority of Chinese Patent Application No. 202110702286.8, filed on Jun. 21, 2021, the disclosure of which is incorporated by reference herein in its entirety as part of the present application

TECHNICAL FIELD

The present disclosure relates to the Internet field and the Internet of Things (IoT) field, and in particular, to a method for interconversion between protocols.

BACKGROUND ART

With the development of Internet of Things (IoT) technology in recent years, application fields of the IoT continue to expand, covering various fields such as smart home, unmanned driving, and "smart city". The IoT has already transformed from an emerging product to an indispensable existence of an information society. The Internet is infrastructure of the information society. Therefore, there is a natural requirement for interconnection between the Internet and the IoT, so that an Internet device and an IoT device can communicate with each other. For example, in a scenario of environmental data acquisition, a sensor terminal deployed outdoors delivers required data to an IoT gateway. The gateway processes the data and stores processed data to a server. The server provides an Internet access interface for users such as a researcher to access the required data.

A message queuing telemetry transport (MQTT) protocol is a common protocol in the IoT field, while a hypertext transfer protocol/hypertext transfer protocol secure (HTTP/HTTPS) protocol is a basic protocol in the Internet field. IoT devices generally have low performance and do not use the HTTP/HTTPS protocol, while Internet devices generally do not support the MQTT protocol. If there is a need to perform communication between the Internet device and the IoT device, one party needs to support the protocol of the other party. However, there are countless device manufacturers on the market, and it is difficult to unify supports of the devices for the protocol. Therefore, in view of this dilemma, a method is needed to achieve conversion between the HTTP/HTTPS protocol and the MQTT protocol.

SUMMARY

Embodiments of the present disclosure provide a method for interconversion between protocols, which can improve data transmission efficiency.

A method for interconversion between protocols includes the following steps:

Step 1: pre-establishing a publication/subscription list, where the publication/subscription list is used to record a publication/subscription relationship between a publisher and a subscriber, a protocol type used by the publisher, and a protocol type used by the subscriber;

Step 2: when a packet published by the publisher is received, searching the publication/subscription list for a protocol type of the packet; and extracting a packet data payload from the packet based on the protocol type of the packet;

Step 3: determining whether a size of the packet data payload is less than a preset combination threshold; and if yes, proceeding to step 4, or if no, proceeding to step 5;

Step 4: sending the packet data payload to a packet data payload queue of the publisher, combining a packet data payload in the packet data payload queue when a size of the packet data payload queue reaches a preset transmission threshold or no new packet is received after a preset waiting duration, and then proceeding to step 5;

Step 5: searching the publication/subscription list for all subscribers corresponding to the publisher; and Step 6: performing protocol conversion on the packet one by one based on protocol types used by the corresponding subscribers, and sending protocol-converted packets to the corresponding subscribers.

It may be learned from the foregoing technical solutions provided in the embodiments of the present disclosure that in this embodiment of the present disclosure, the following is included. In step 1, the publication/subscription list is pre-established, where the publication/subscription list is used to record the publication/subscription relationship between a publisher and a subscriber, the protocol type used by the publisher, and the protocol type used by the subscriber. In step 2, when the packet published by the publisher is received, the protocol type of the packet is searched based on the publication/subscription list; and the packet data payload is extracted from the packet based on the protocol type of the packet. In step 3, it is determined whether the size of the packet data payload is less than the preset combination threshold; and if yes, step 4 is proceeded, or if no, step 5 is proceeded. In step 4, the packet data payload is sent to the packet data payload queue of the publisher, the packet data payload in the packet data payload queue is combined when the size of the packet data payload queue reaches the preset transmission threshold or no new packet is received after the preset waiting duration, and then step 5 is proceeded. In step 5, the publication/subscription list is searched for all the subscribers corresponding to the publisher. In step 6, protocol conversion is performed on the packet one by one based on the protocol types used by the corresponding subscribers, and the protocol-converted packets are sent to the corresponding subscribers. By using the present disclosure, data transmission efficiency can be improved.

The additional aspects and advantages of the present disclosure will be partially given in the following description, and become clear in the following description, or be learned through the practice of the present disclosure.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION OF THE EMBODIMENTS

The embodiments of the present disclosure are described below in detail. Examples of the embodiments are shown in the accompanying drawings. The same or similar numerals represent the same or similar elements or elements having the same or similar functions throughout the specification. The embodiments described below with reference to the accompanying drawings are examples, and are only used to explain the present disclosure but should not be construed as a limitation to the present disclosure.

For ease of understanding of the embodiments of the present disclosure, several specific embodiments will be taken as examples for further explanation and description in conjunction with the accompanying drawings, and each embodiment does not constitute a limitation to the embodiments of the present disclosure.

Figure 1:
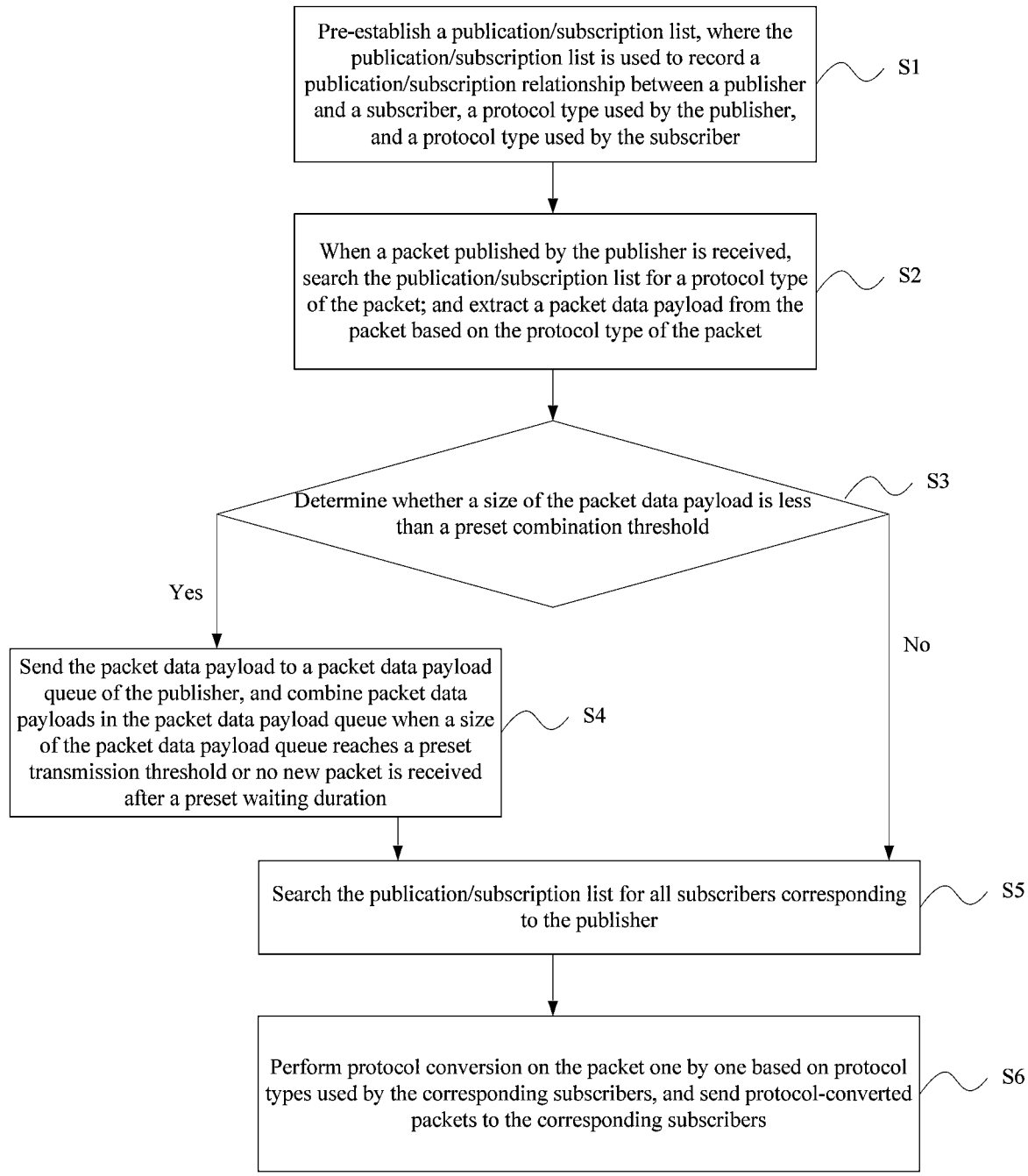
FIG. 1 is a schematic flowchart of a protocol conversion method according to the present disclosure.
Figure 2:
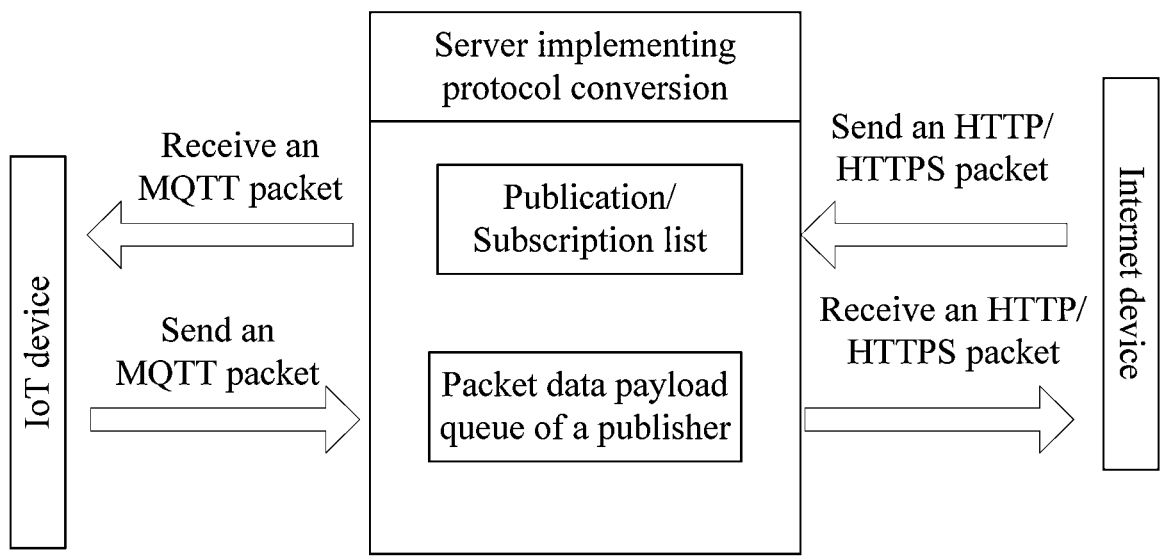
FIG. 2 shows a schematic diagram of a structure of a running environment of a conversion method according to the present disclosure.
Figure 3:
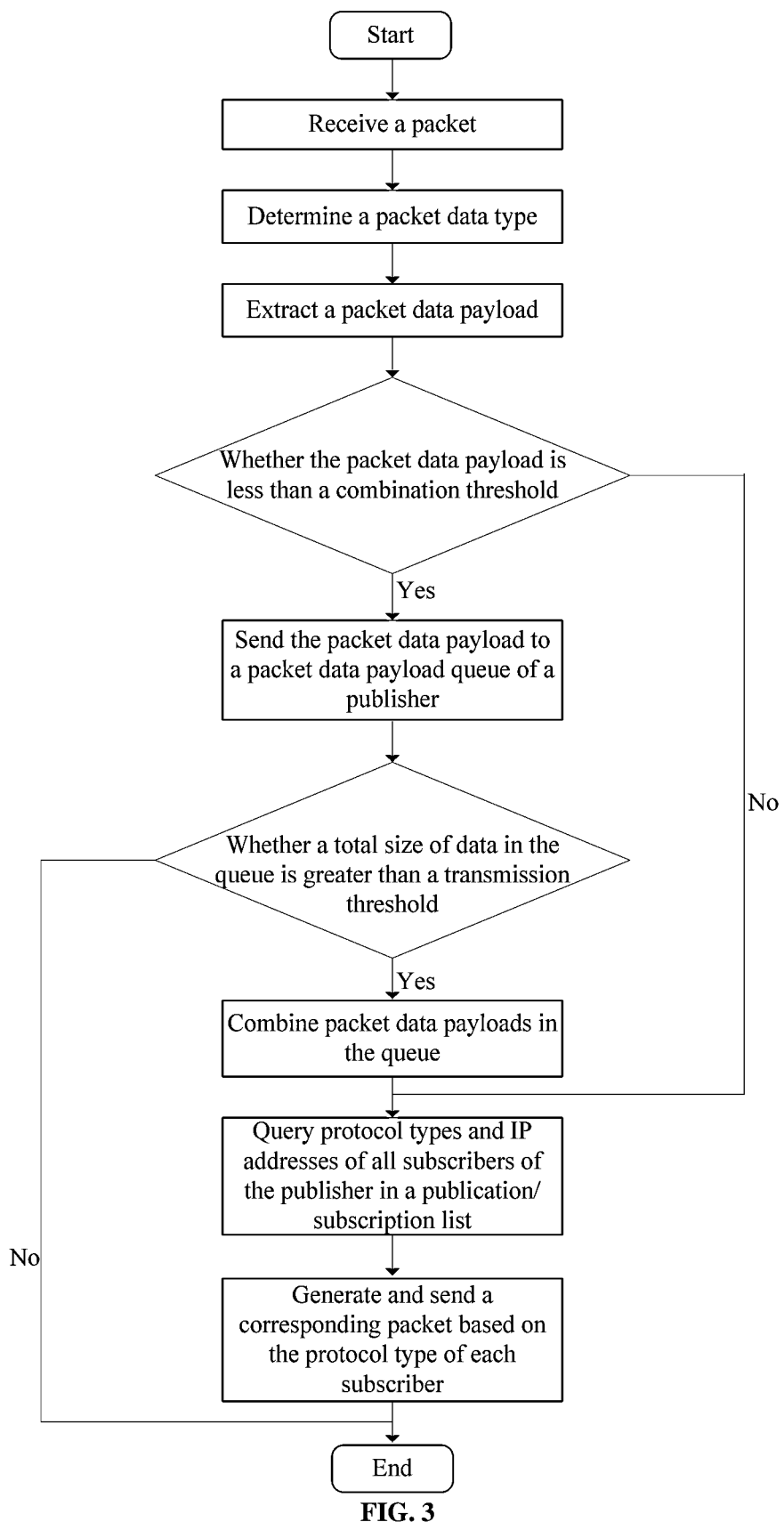
FIG. 3 shows a working flowchart of a conversion method according to the present disclosure.
Figure 4:
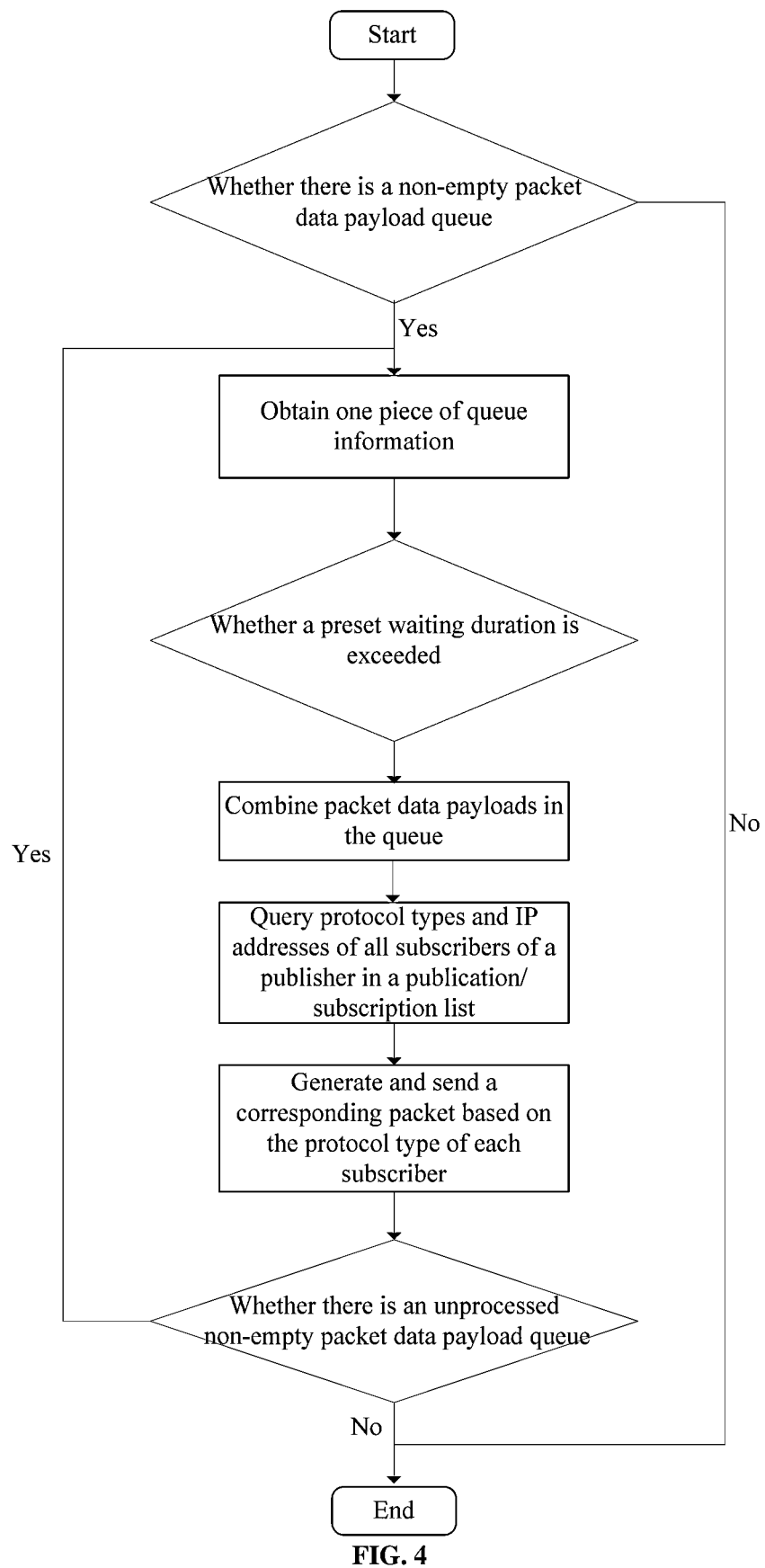
FIG. 4 shows a working flowchart of processing when waiting of a data payload queue times out in a conversion method.

FIG. 1 is a schematic flowchart of a protocol conversion method according to the present disclosure. FIG. 2 shows a schematic diagram of a structure of a running environment of a conversion method according to the present disclosure. FIG. 3 shows a working flowchart of a conversion method according to the present disclosure. FIG. 4 shows a working flowchart of processing when waiting of a packet data payload queue times out in a conversion method. The following description is with reference to each drawing.

As shown in FIG. 1, a method for interconversion between protocols includes the following steps:

Step 1: A server pre-establishes a publication/subscription list, where the publication/subscription list is used to record a publication/subscription relationship between a publisher and a subscriber, a protocol type used by the publisher, and a protocol type used by the subscriber.

Step 2: When a packet published by the publisher is received, the server searches for a protocol type of the packet based on the publication/subscription list; and extracts a packet data payload from the packet based on the protocol type of the packet.

Step 3: The server determines whether a size of the packet data payload is less than a preset combination threshold; and if yes, performs step 4, or if no, proceeds to step 5.

Step 4: The server sends the packet data payload to a packet data payload queue of the publisher, combines a packet data payload in the packet data payload queue when a size of the packet data payload queue reaches a preset transmission threshold or no new packet is received after a preset waiting duration, and then proceeds to step 5.

Step 5: The server searches the publication/subscription list for all subscribers corresponding to the publisher.

Step 6: The server performs protocol conversion on the packet one by one based on protocol types used by the corresponding subscribers, and sends protocol-converted packets to the corresponding subscribers.

Before step 1, the method further includes:

Step A: The server sets the combination threshold, the transmission threshold, and the waiting duration based on a network status.

Step A specifically includes:

The server sets the combination threshold to 50% of a historical average size of a packet data payload sent by the publisher.

The server sets the transmission threshold to the historical average size of the packet data payload sent by the publisher.

The server sets the waiting duration to a historical average value of an absolute value of a difference between arrival times of adjacent packet data payloads when the packet data payload queue of the publisher receives each of continuous data payloads.

Step 6 specifically includes:

Step 61: The server performs encoding processing on the packet data payload.

Step 62: The server constructs, based on a packet data payload obtained after encoding processing, a packet corresponding to the protocol type used by the subscriber.

Step 61 specifically includes: The server performs encoding processing on a combined packet data payload.

Further:

When the protocol type used by the subscriber is HTTP/HTTPS, encode the packet data payload by using a UTF-8 encoding format.

When the protocol type used by the subscriber is MQTT, encode the packet data payload by using a binary encoding format.

Step 62 specifically includes:

When the protocol type used by the subscriber is an HTTP protocol, construct the packet by using an HTTP packet format.

When the protocol type used by the subscriber is an HTTPS protocol, construct the packet by using the HTTP packet format, and encrypt the packet by using an SSL/TLS protocol.

When the protocol type used by the subscriber is MQTT, construct the packet by using an MQTT packet format.

The following describes an application scenario of the present disclosure. As shown in FIG. 2, FIG. 3, and FIG. 4, a method for interconversion between an MQTT protocol and an HTTP/HTTPS protocol includes the following steps:

Step (A): Before protocol conversion is performed, first set a combination threshold, a transmission threshold, and waiting duration based on a network status and an application requirement. When the network status is good, appropriately increase the combination threshold, the transmission threshold, and the waiting duration. For a delay-insensitive application, appropriately increase the combination threshold, the transmission threshold, and the waiting duration. Set the combination threshold to 50% of a historical average size of a packet data payload sent by a publisher. Set the transmission threshold to the historical average size of the data payload sent by the publisher. Set the waiting duration to a historical average value of an absolute value of a difference between arrival times of adjacent packet data payloads when a packet data payload queue of the publisher receives each of continuous data payloads.

Step (1): Define a publication/subscription list that is used to record a publication/subscription relationship between devices and a protocol type used by the device; and periodically update the publication/subscription list in step (1).

Step (2): When a packet published by the publisher is received, determine a packet protocol type of the packet, and extract a packet data payload.

Step (3): Determine whether a size of the extracted packet data payload in step (2) is less than the set combination threshold, and if yes, perform step (4), or if no, perform step (5).

Step (4): Send a corresponding packet data payload to the packet data payload queue of the publisher, combine data in the queue after a total size of the data in the queue reaches the set transmission threshold or after the set waiting duration, and perform step (5).

Step (5): Search the publication/subscription list for all subscribers to which the publisher belongs, package data based on a protocol to which the subscriber belongs, and send a packaged packet to the subscriber.

Based on the present disclosure, information exchange between an Internet of Things (IoT) device using an MQTT protocol and an Internet device using an HTTP/HTTPS protocol is implemented.

The following describes another application scenario.

The present disclosure provides a method for interconversion between an MQTT protocol and an HTTP/HTTPS protocol.

(1) A machine running this method maintains a publication/subscription list.

(2) When a packet sent by a publisher is received, determine whether a packet protocol is an MQTT protocol or an HTTP/HTTPS protocol, and extract a packet data payload based on a protocol structure.

(3) Determine whether a size of the packet data payload is less than a preset transmission threshold; and if yes, send the packet data payload to a data payload queue of the publisher, and combine data payloads after a total size of the data payloads in the queue reaches the transmission threshold, and prepare to send a combined data payload, or if not, directly prepare to send the packet data payload.

(4) Search the publication/subscription list for all subscribers of the publisher of the packet.

(5) Encode the data payload based on a packet protocol used by a subscriber in the subscription list, and then package the data payload based on a corresponding packet format.

(6) Send a packaged packet to the subscriber.

The present disclosure has a clear structure, is easy to expand, and can improve data transmission efficiency, and can be directly deployed on an existing MQTT gateway.

The following describes another application scenario.

As shown in FIG. 1, a method for interconversion between an MQTT protocol and an HTTP/HTTPS protocol includes the following steps:

(1) Data receiving: After (a server) receives a packet, first determine a packet protocol is which one of an MQTT protocol, an HTTP protocol, and an HTTPS protocol.

(2) Data extraction: Based on a packet protocol structure, extract a data payload in the packet received in (1).

(3) Data combination: Determine whether the data payload extracted in (2) is less than a preset combination threshold; and if yes, send the data payload to a data payload queue of a publisher, combine data in the queue after a total size of the data in the queue reaches a set transmission threshold or after set waiting duration, and prepare to send combined data, or if not, directly prepare to send the data payload without sending to the queue.

(4) Search for subscription: Search a subscriber list of a packet sender.

(5) Data encoding: Determine, based on the subscriber list found in (3), corresponding data encoding for subscribers running different protocols. Specific steps are as follows:

1) When a subscriber end is in an HTTP/HTTPS protocol, encode the data obtained in (3) by using a UTF-8 encoding format.

2) When a subscriber end is in an MQTT protocol, encode the data obtained in (3) in a binary encoding format.

(6) Packet construction: Determine, based on the subscriber list found in (4), how to construct encoded data in (5) into a corresponding protocol packet. Specific steps are as follows:

1) When the subscriber is in the HTTP protocol, construct the packet by using an HTTP packet format.

2) When the subscriber is in an HTTPS protocol, construct the packet by using the HTTP packet format, and encrypt the packet by using an SSL/TLS protocol.

3) When the subscriber is in an MQTT protocol, construct the packet by using an MQTT packet format.

(7) Packet sending: Send the packet constructed in (5) to the subscriber.

The present disclosure provides the method for interconversion between an MQTT protocol and an HTTP/HTTPS protocol. Based on the method, the publication/subscription list is first defined, which is used to record the publication/subscription relationship between devices and the protocol type used by the device. When the packet of the publisher is received, unpackaging is performed based on the protocol type, to extract the data payload, and determine whether the size of the data payload is less than the preset threshold; and if yes, the data payload is sent to the data payload queue of the publisher, and then the data payloads in the queue are combined based on a dynamic control policy, or if not, a packaging process is directly entered. The subscribers of the publisher are obtained by querying the publication/subscription list, and packaging is performed, based on different protocols used by the subscribers, for sending. In the present disclosure, in addition to implementing conversion between the MQTT protocol and the HTTP/HTTPS protocol, data transmission efficiency is also improved by combining the data payloads.

The above merely describes specific embodiments of the present disclosure, but the protection scope of the present disclosure is not limited thereto. A person skilled in the art can easily conceive modifications or replacements within the technical scope of the present disclosure, and these modifications or replacements shall fall within the protection scope of the present disclosure. Therefore, the protection scope of the present disclosure should be subject to the protection scope of the claims.

What is claimed is:

1. A method for interconversion between protocols, comprising the following steps:
   Step 1: pre-establishing a publication/subscription list, wherein the publication/subscription list is used to record a publication/subscription relationship between a publisher and a subscriber, a protocol type used by the publisher, and a protocol type used by the subscriber;
   Step 2: when a packet published by the publisher is received, searching the publication/subscription list for a protocol type of the packet; and extracting a packet data payload from the packet based on the protocol type of the packet;
   Step 3: determining whether a size of the packet data payload is less than a preset combination threshold; and if yes, proceeding to step 4, or if no, proceeding to step 5;
   Step 4: sending the packet data payload to a packet data payload queue of the publisher, combining a packet data payload in the packet data payload queue when a size of the packet data payload queue reaches a preset transmission threshold or no new packet is received after a preset waiting duration, and then proceeding to step 5;

Step 5: searching the publication/subscription list for all subscribers corresponding to the publisher; and Step 6: performing protocol conversion on the packet one by one based on protocol types used by the corresponding subscribers, and sending protocol-converted packets to the corresponding subscribers, wherein before step 1, the method further comprises:

Step A: setting the combination threshold, the transmission threshold, and the waiting duration based on a network status; and step A specifically comprises:

setting the combination threshold to 50% of a historical average size of a packet data payload sent by the publisher;

setting the transmission threshold to the historical average size of the packet data payload sent by the publisher; and setting the waiting duration to a historical average value of an absolute value of a difference between arrival times of adjacent packet data payloads when the packet data payload queue of the publisher receives each of continuous data payloads.

2. The method according to claim 1, wherein said performing protocol conversion on the packet in step 6 specifically comprises: Step 6.1: performing encoding processing on the packet data payload; and Step 6.2: constructing, based on a packet data payload obtained after encoding processing, a packet corresponding to the protocol type used by the subscriber.

3. The method according to claim 2, wherein after the packet data payload is combined, step 6.1 specifically comprises: performing encoding processing on a combined packet data payload.

4. The method according to claim 2, wherein step 6.1 specifically comprises: when the protocol type used by the subscriber is Hypertext Transfer Protocol Secure/ Hypertext Transfer Protocol (HTTP/HTTPS), encoding the packet data payload by using a Unicode Transformation Format (UTF)-8 encoding format; and when the protocol type used by the subscriber is Message Queuing Telemetry Transport (MQTT), encoding the packet data payload by using a binary encoding format.

5. The method according to claim 2, wherein step 6.2 specifically comprises:

when the protocol type used by the subscriber is HTTP, constructing the packet by using an HTTP packet format;

when the protocol type used by the subscriber is HTTPS, constructing the packet by using the HTTP packet format, and encrypting the packet by using a Secure Sockets Layer/ Transport Layer Security (SSL/TLS) protocol; and when the protocol type used by the subscriber is MQTT, constructing the packet by using an MQTT packet format.

* * * * *